United States Patent [19]

Shinto et al.

[11] Patent Number: 5,396,137
[45] Date of Patent: Mar. 7, 1995

[54] BRUSHLESS MOTOR

[75] Inventors: Masayuki Shinto, Sabae; Hiroshi Dohi, Katano, both of Japan

[73] Assignee: Matsushita Electric Industrial Co., Ltd., Kadoma, Japan

[21] Appl. No.: 99,485

[22] Filed: Jul. 28, 1993

[30] Foreign Application Priority Data

Sep. 4, 1992 [JP] Japan .................................. 4-236759

[51] Int. Cl.$^6$ ............................................ H02K 21/12
[52] U.S. Cl. ....................................... 310/156; 310/51
[58] Field of Search ........................ 310/156, 154, 51

[56] References Cited

FOREIGN PATENT DOCUMENTS 60-55248  4/1985  Japan .
60-62842  5/1985  Japan .
1-122352  5/1989  Japan .................................... 310/156

Primary Examiner—Steven L. Stephan
Assistant Examiner—Clayton E. LaBalle
Attorney, Agent, or Firm—Cushman, Darby & Cushman

[57] ABSTRACT

In a brushless motor having a stator with windings mounted in plural slots and a rotor with a permanent magnet consisting of plural poles, the poles have two kinds of occupation angles on the whole in the rotating direction of the rotor, and a difference between the two occupation angles is equal to one slot-pitch.

10 Claims, 10 Drawing Sheets

BRUSHLESS MOTOR

FIELD OF THE INVENTION AND RELATED ART STATEMENT

1. Field of the Invention

The present invention relates to an improved brushless motor in which a stator with windings and a rotor having a permanent magnet are provided.

2. Description of the Related Art

In recent years, a brushless motor, in which a permanent magnet is employed in a rotor, has been often used for the purpose of improving the controllability and the efficiency of rotating machines and reducing their noises.

FIG. 8 is a perspective view showing a stator 1 and a rotor 5 which constitute a four-pole inner revolving type brushless motor generally used in the conventional art. In FIG. 8, a stator 1 consists of a stator core 2 and stator windings 4. The stator windings 4 are mounted in twenty-four slots 3 which are formed in the stator core 2 and arranged with a uniform angular interval. A rotor 5 consists of a permanent magnet 6 and a rotor core 7. The permanent magnet 6 is rotatably held by the known bearing means (not shown) so that a cylindrical surface of the permanent magnet 6 may be disposed to face magnetic poles of the stator core 2. The rotor core 7, which is provided inside the permanent magnet 6, forms magnetic paths therein in connection with the stator core 2. The permanent magnet 6 is a quadruple magnet having S, N, S and N poles. These four poles have respective occupation angles $\theta_1$, $\theta_2$, $\theta_3$ and $\theta_4$, each of which is 90°, around the axis of rotation of the rotor 5.

FIG. 9 is a cross-sectional view showing the stator 1 and the rotor 5 shown in FIG. 8 at an instance of the running of the brushless motor. Illustrations of the stator windings 4 and hatching on the rotor 5 are omitted for the sake of simplicity of the drawings. Lines shown by letters "C" represent boundaries between the N and S poles. By forming the slots 3 in the stator core 2, plural (i.e., 24 pieces) teeth members 8 are left. Since the number of the slots 3 is twenty-four, each of the N and S poles faces six slots 3. The furnishing of the stator windings 4 with the stator 1 and the supply of electric power thereto are carried out in a predetermined manner so that a rotating magnetic field may appear to correspond to the positions of N and S poles of the permanent magnet 6.

In the above-mentioned conventional structure, variation of the rotation torque having a waveform similar to a sine wave occurs when the boundaries C are passing in front of the teeth members 8. This variation of the torque is caused by reduction of a magnetic reluctance and is hereinafter referred to as a "cogging torque". This cogging torque is generated at each of four boundaries C. As aforementioned, the twenty-four slots 3 are aligned the circumferential direction with the uniform angular interval, and the angles $\theta_1$, $\theta_2$, $\theta_3$ and $\theta_4$, which show respective circumferential extents of the N and S poles of the permanent magnet 6, are equal to each other. Therefore, a cogging torque $T_1$ generated from the whole of the brushless motor is four times as large as a cogging torque generated at each boundary C.

FIG. 10 is an illustration showing a linear-expanded positional relation between the boundary C and the teeth member 8 and a waveform of the cogging torque caused by each boundary C. This waveform of the cogging torque has the maximum amplitude $T_m$. An angle $\phi$ is formed between the centerline of the slot 3 and an angular position of the boundary C. When the angle $\phi$ is zero degrees, the cogging torque is zero. When the permanent magnet 6 moves (rotates) rightward in FIG. 10, the cogging torque increases and decreases with a locus similar to a sine wave. When the angle $\phi$ becomes 180°, the cogging torque becomes zero. Also, when the permanent magnet 6 moves (rotates) leftward in FIG. 10, the cogging torque decreases and increases with a locus similar to a sine wave. When the angle $\phi$ becomes $-180°$, the cogging torque becomes zero. Therefore, the cogging torque has one-period-waveform similar to the complete sine wave within an angular interval (defined as one slot-pitch) from the centerline of teeth member 8 to the centerline of the adjacent teeth member 8. In case four poles are provided in the motor as shown in FIGS. 8 and 9, the cogging torque $T_1$ is also represented by an equation:

$$T_1 = 4 \times T_m \sin \phi \tag{1}$$

During one revolution of the rotor 5, the cogging torque appears N-times, the number of which corresponds to the number of slots 3 of the stator core 2.

Therefore, the above-mentioned conventional brushless motor generates large vibration and noise, which are caused by the N-times occurrence of the cogging torque, during operation. If worst comes to worst, the brushless motor could not be suitable now for practical use. To remove the above-mentioned short-comings, the Japanese unexamined utility model application (JIKKAI) Sho 60-62842 showed the magnet, in which the center part of the magnetic pole is made thick, thereby decreasing the amount of magnetic flux at the boundary of the N pole and the S pole and thus reducing the cogging torque. Further, the Japanese unexamined utility model application (JIKKAI) Sho 60-55248 showed the magnet in which the magnetic pole is skewed by modifying a shape of the magnet so that an integrated value of the cogging torque in the direction of the rotation axis can be offset.

In these prior art structures, the cogging torque can be reduced or offset, but an effective amount of magnetic flux decreases. As a result, it becomes impossible to obtain a sufficient output from the brushless motor, and hence an efficiency of the brushless motor is lowered.

OBJECT AND SUMMARY OF THE INVENTION

An object of the present invention is to offer a brushless motor capable of both offsetting the cogging torque and preventing a reduction in the amount of effective magnetic flux.

In order to achieve the above-mentioned object, the brushless motor of the present invention comprises:
- a stator including a stator core and stator windings, the stator having n pieces of slots in which the stator windings are mounted; and
- a rotor including a rotor core and a permanent magnet which consists of m pieces of poles to face the stator; wherein
- m is a divisor of n, and the poles have two kinds of occupation angles $\theta_L$ [deg.] and $\theta_S$ [deg.] in a rotating direction of said rotor on the whole, wherein said occupation angle $\theta_L$ is larger than said occupation angle $\theta_S$ by an angle of (360°/n).

According to the above-mentioned brushless motor, vibration and noise during operation can be reduced, and large output and high efficiency are obtained.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiments of the present invention are described with reference to the accompanying drawings.

Embodiment 1

Figure 1:
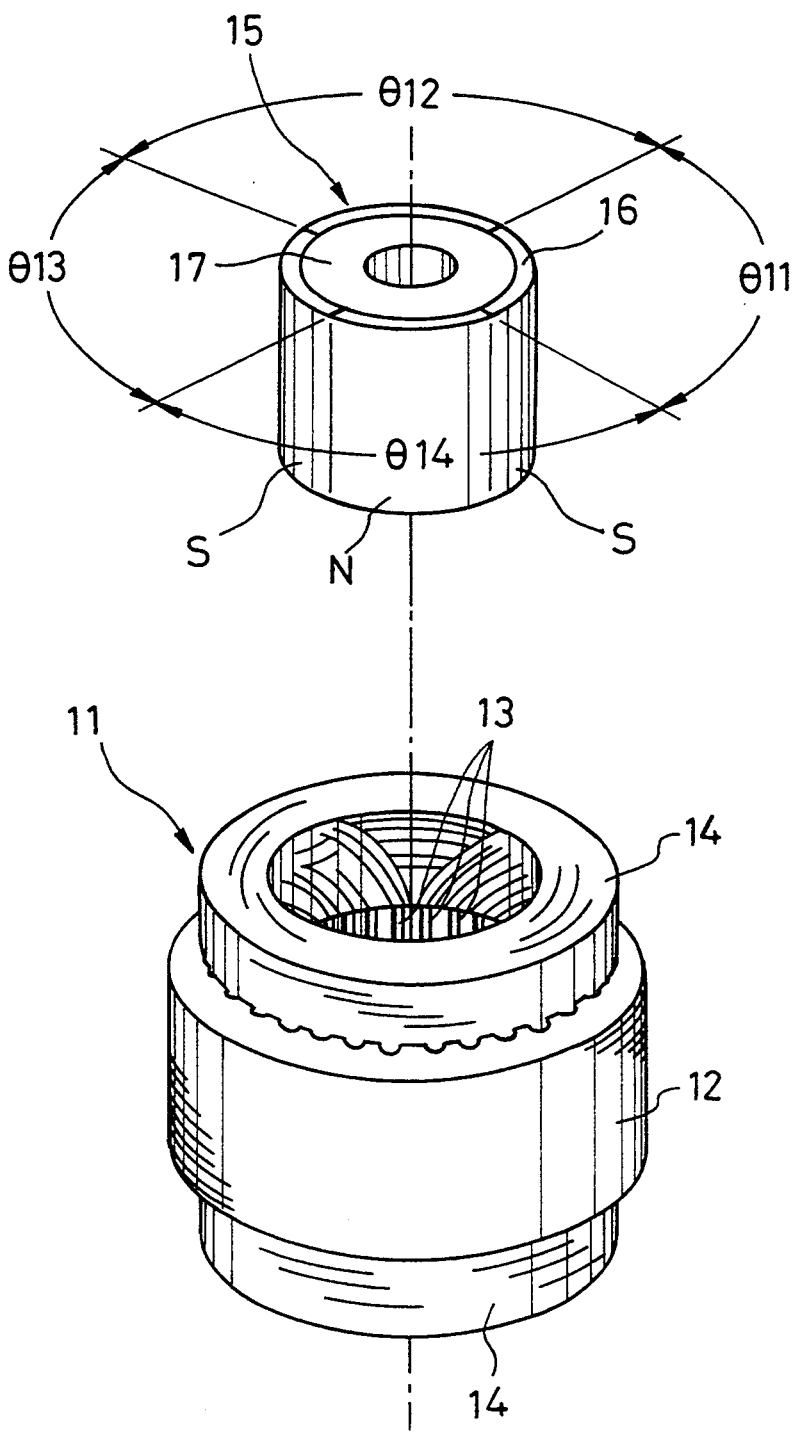
FIG. 1 is a perspective view showing a part of a brushless motor of a first embodiment in the present invention.

FIG. 1 is a perspective view showing a stator 11 and a rotor 15 which constitute a four-pole inner revolving type brushless motor. In FIG. 1, a stator 11 consists of a stator core 12 and stator windings 14. The stator windings 14 are mounted in twenty-four slots 18 which are formed in the stator core 12 and arranged with a uniform angular interval. The number of poles is thus a divisor of the number of the slots 18. A rotor 15 consists of a permanent magnet 16 and a rotor core 17. The permanent magnet 16 is rotatably held by the known bearing means (not shown) so that a cylindrical surface of the permanent magnet 16 may be disposed to face magnetic poles of the stator core 12. The rotor core 17, which is provided inside the permanent magnet 16, forms magnetic paths therein in connection with the stator core 12. The permanent magnet 16 is a quadruple magnet having four poles. These four poles have respective occupation angles $\theta 11$ of 97.5°, $\theta 12$ of 97.5° $\theta 13$ of 82.5° and $\theta 14$ of 82.5° in the rotating direction of the rotor 15.

Figure 2:
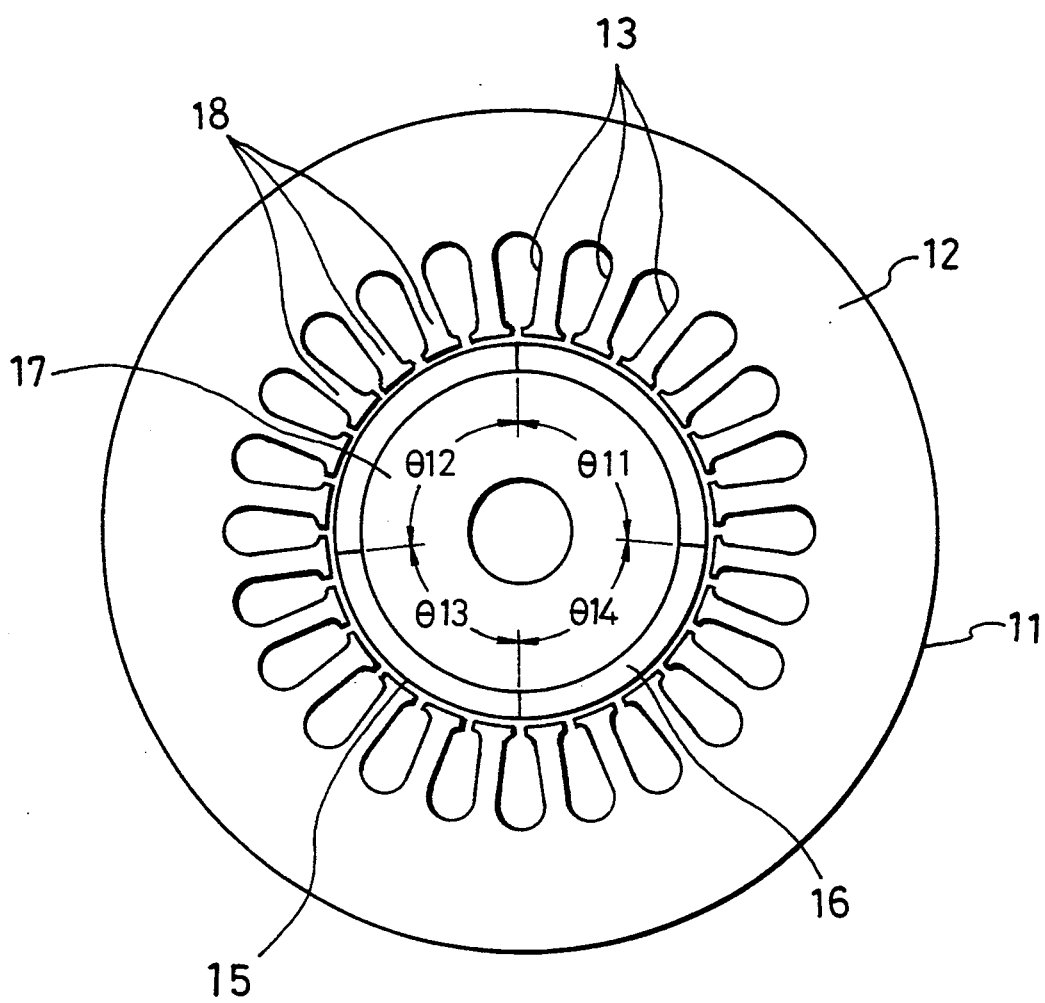
FIG. 2 is a cross-sectional view showing a part of the brushless motor of the first embodiment.

FIG. 2 is a cross-sectional view showing the stator 11 and the rotor 15 shown in FIG. 1 at an instant of the running of the brushless motor. Illustration of the stator windings 14 and hatching on the rotor 15 are omitted for the sake of simplicity of the drawings. By forming the slots 13 in the stator core 12, plural (i.e., 24 pieces) teeth members 18 are left.

In the structure shown in FIGS. 1 and 2, one slot-pitch, which is an angular interval between centerlines of adjacent two slots 13, is 15° (=360°/24). Therefore, the angles $\theta 11$ of 97.5°, $\theta 12$ of 97.5°, $\theta 13$ of 82.5° and $\theta 14$ of 82.5° correspond to 6.5 (=97.5/15), 6.5, 5.5 (=82.5/15) and 5.5 slot-pitches, respectively. That is, there are larger and smaller slot-pitches 6.5 and 5.5, and a difference between them is equal to one slot-pitch (15°).

A cogging torque $T_2$ of the brushless motor shown in FIGS. 1 and 2 is represented by an equation:

$$T_2 = T_m \sin \phi + T_m \sin (\phi - 180°) + T_m \sin \phi + T_m \sin (\phi + 180°) = 0 \qquad (2).$$

Embodiment 2

Figure 3:
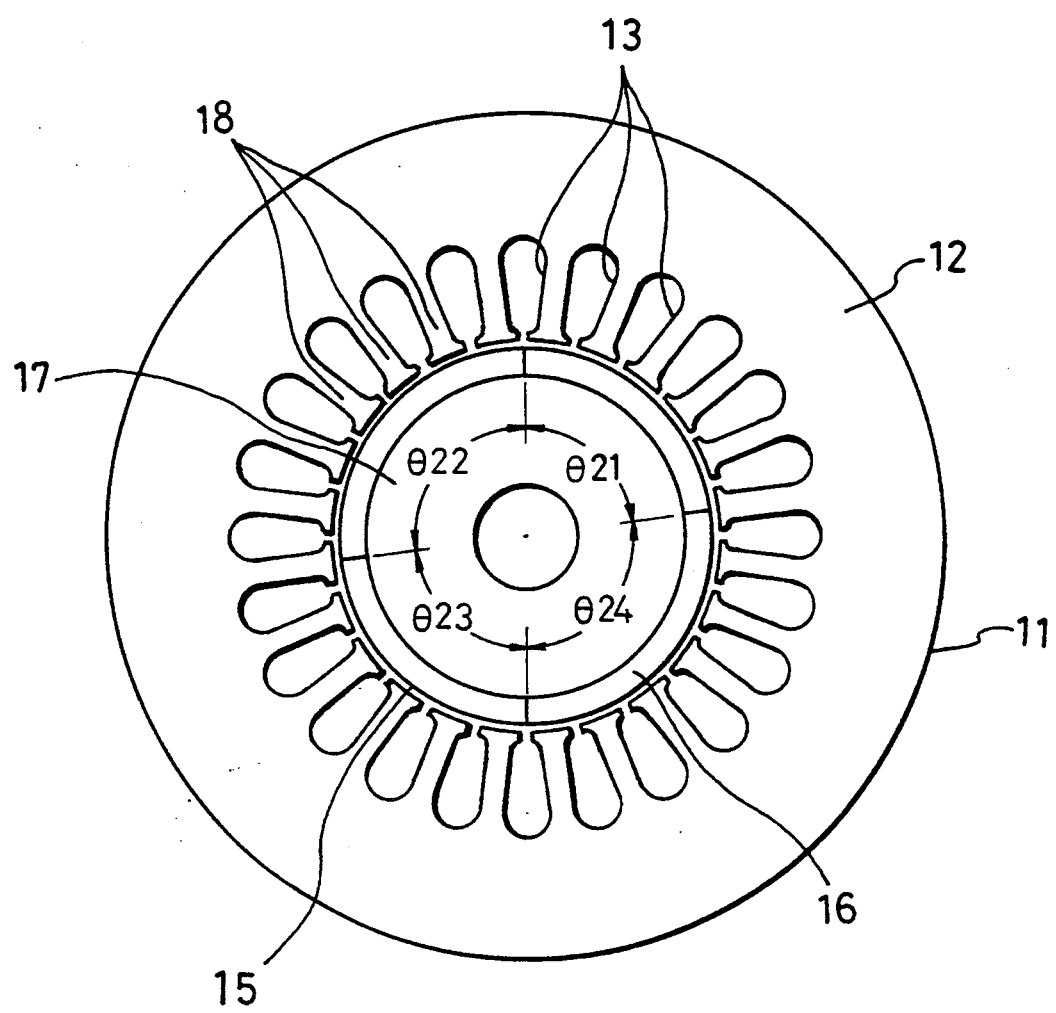
FIG. 3 is a cross-sectional view showing a part of the brushless motor of a second embodiment in the present invention.

FIG. 3 is a cross-sectional view showing the brushless motor of a second embodiment. Corresponding parts to the first embodiment are shown by the same numerals, and the description made thereon in the first embodiment is similarly applied. Four poles are provided in the permanent magnet 16, and twenty-four slots 13 are formed in the stator core 12 and arranged with a uniform angular interval. The number of poles is a divisor of the number of the slots 13. These four poles have respective occupation angles $\theta 21$ of 82.5°, $\theta 22$ of 97.5°, $\theta 23$ of 82.5° and $\theta 24$ of 97.5° which are arranged into rotational symmetrical with respect to the rotation axis of the rotor 15 by a rotation angle of 180°. Therefore, the angles $\theta 21$, $\theta 22$, $\theta 23$ and $\theta 24$ correspond to 5.5, 6.5, 5.5 and 6.5 slot-pitch, respectively. That is, there are larger and smaller slot-pitches 6.5 and 5.5, and a difference between them is equal to one slot-pitch (15°).

A cogging torque $T_3$ of the above-mentioned second embodiment is represented by an equation:

$$T_3 = T_m \sin \phi + T_m \sin (\phi - 180°) + T_m \sin \phi + T_m \sin (\phi - 180°) = 0 \qquad (3)$$

A value of the cogging torque $T_3$ is thus made zero.

Embodiment 3

Figure 4:
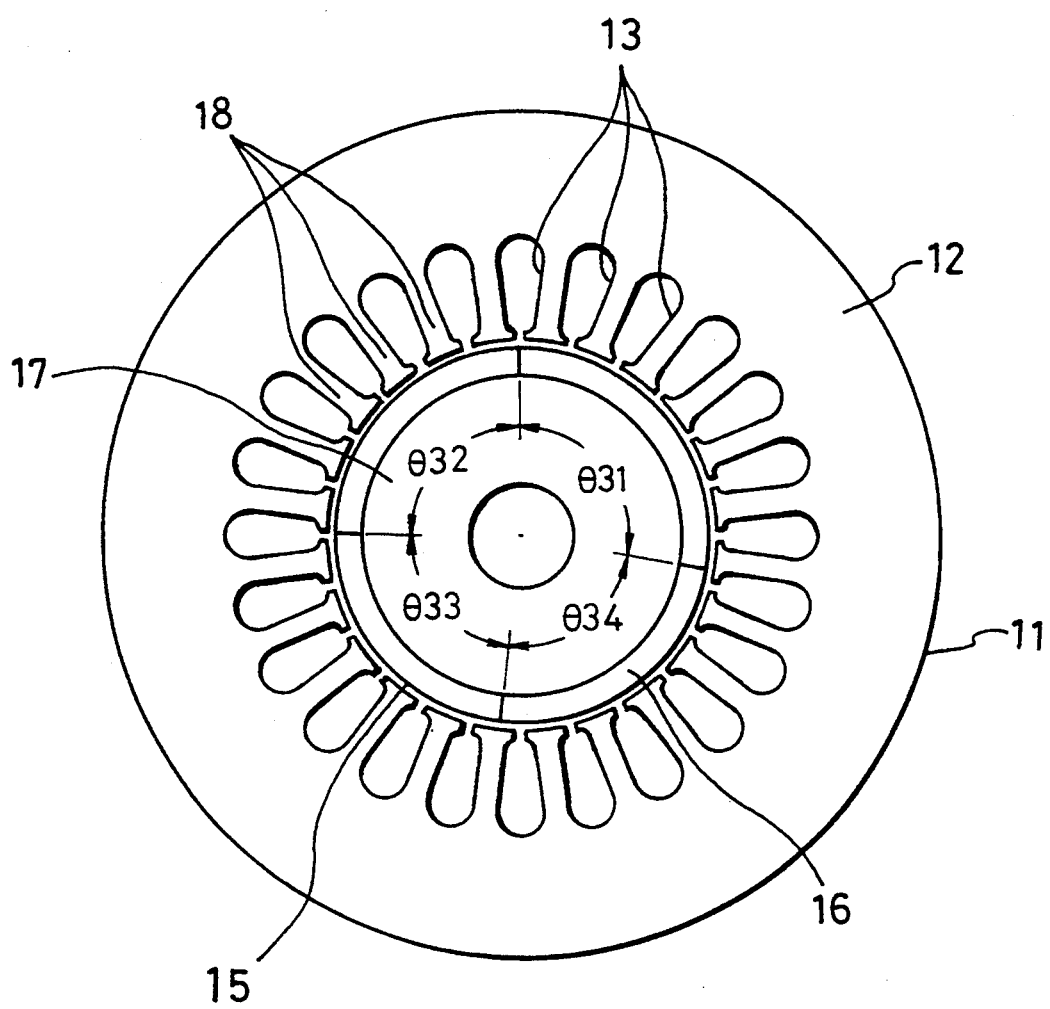
FIG. 4 is a cross-sectional view showing a part of the brushless motor of a third embodiment in the present invention.

FIG. 4 is a cross-sectional view showing the brushless motor of a third embodiment. Corresponding parts to the first embodiment are shown by the same numerals, and the description made thereon in the first embodiment is similarly applied. Four poles are provided in the permanent magnet 16, and twenty-four slots 13 are formed in the stator core 12 and arranged with a uniform angular interval. The number of poles is a divisor of the number of the slots 13. These four poles have respective occupation angles $\theta 31$ of 101.25°, $\theta 32$ of 86.25°, $\theta 33$ of 86.25° and $\theta 34$ of 86.25°. Therefore, the angles $\theta 31$, $\theta 32$, $\theta 33$ and $\theta 34$ correspond to 6.75, 5.75, 5.75 and 5.75 slot-pitch, respectively. That is, there are larger and smaller slot-pitches 6.75 and 5.75, and a difference between them is equal to one slot-pitch (15°).

A cogging torque $T_4$ of the above-mentioned third embodiment is represented by an equation:

$$T_4 = T_m \sin \phi + T_m \sin(\phi + 90°) + T_m \sin(\phi + 180°) + T_m \sin(\phi + 270°) = 0 \quad (4)$$

A value of the cogging torque $T_4$ is thus made zero.

Embodiment 4

Figure 5:
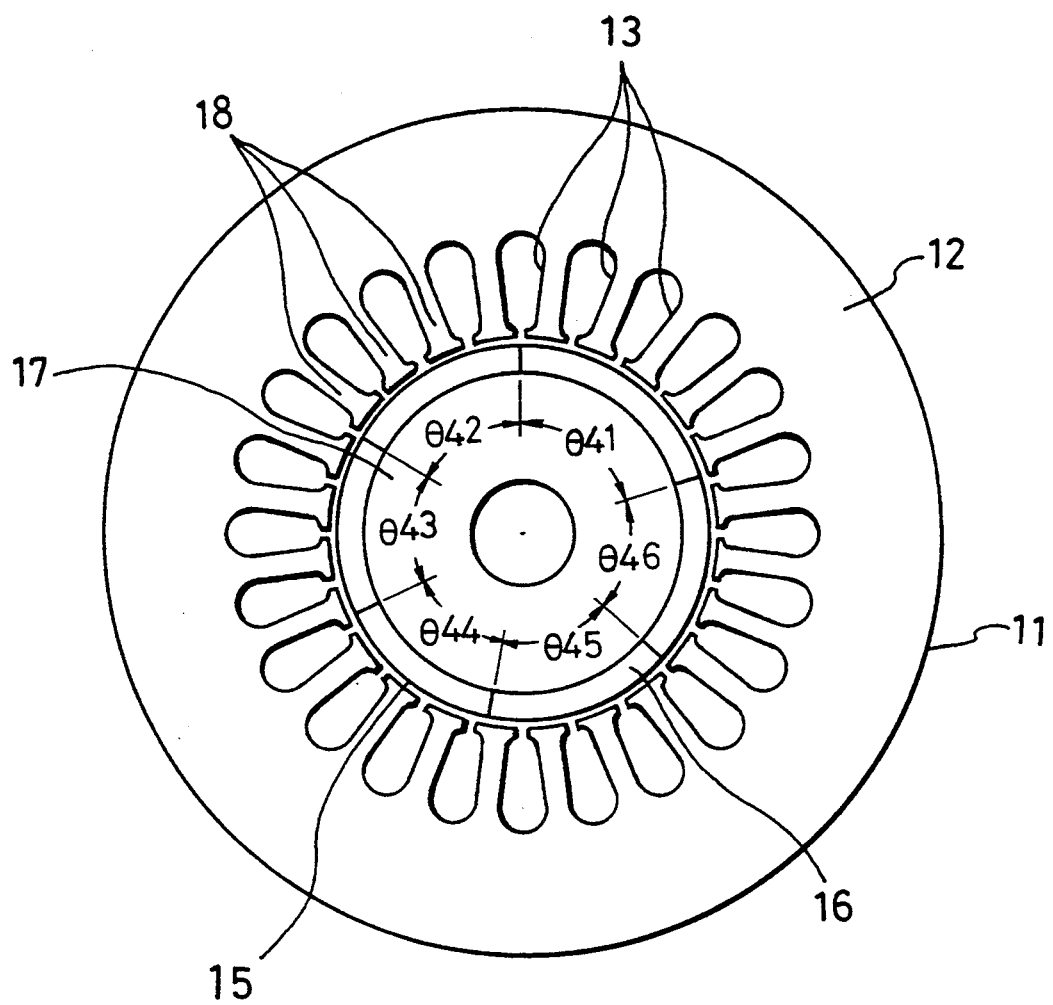
FIG. 5 is a cross-sectional view showing a part of the brushless motor of a fourth embodiment in the present invention.

FIG. 5 is a cross-sectional view showing the brushless motor of a fourth embodiment. Corresponding parts to the first embodiment are shown by the same numerals, and the description made thereon in the first embodiment is similarly applied. Six poles are provided in the permanent magnet 16, and twenty-four slots 13 are formed in the stator core 12 and arranged with a uniform angular interval. The number of poles is a divisor of the number of the slots 13. These six poles have respective occupation angles $\theta 41$ of 72.5°, $\theta 42$ of 57.5°, $\theta 43$ of 57.5°, $\theta 44$ of 57.5°, $\theta 45$ of 57.5° and $\theta 46$ of 57.5°. Therefore, the angles $\theta 41$, $\theta 42$, $\theta 43$, $\theta 44$, $\theta 45$ and $\theta 46$ correspond to 4.833, 3.833, 3.833, 3.833, 3.833 and 3.833 slot-pitches, respectively. That is, there are larger and smaller slot-pitches 4.833 and 3.833, and a difference between them is equal to one slot-pitch (15°).

A cogging torque $T_5$ of the above-mentioned fourth embodiment is represented by an equation:

$$T_5 = T_m \sin\phi + T_m \sin(\phi + 60°) + \\ T_m \sin(\phi + 120°) + T_m \sin(\phi + 180°) + \\ T_m \sin(\phi + 240°) + T_m \sin(\phi + 300°) = 0. \quad (5)$$

A value of the cogging torque $T_5$ is thus made zero.

Embodiment 5

Figure 6:
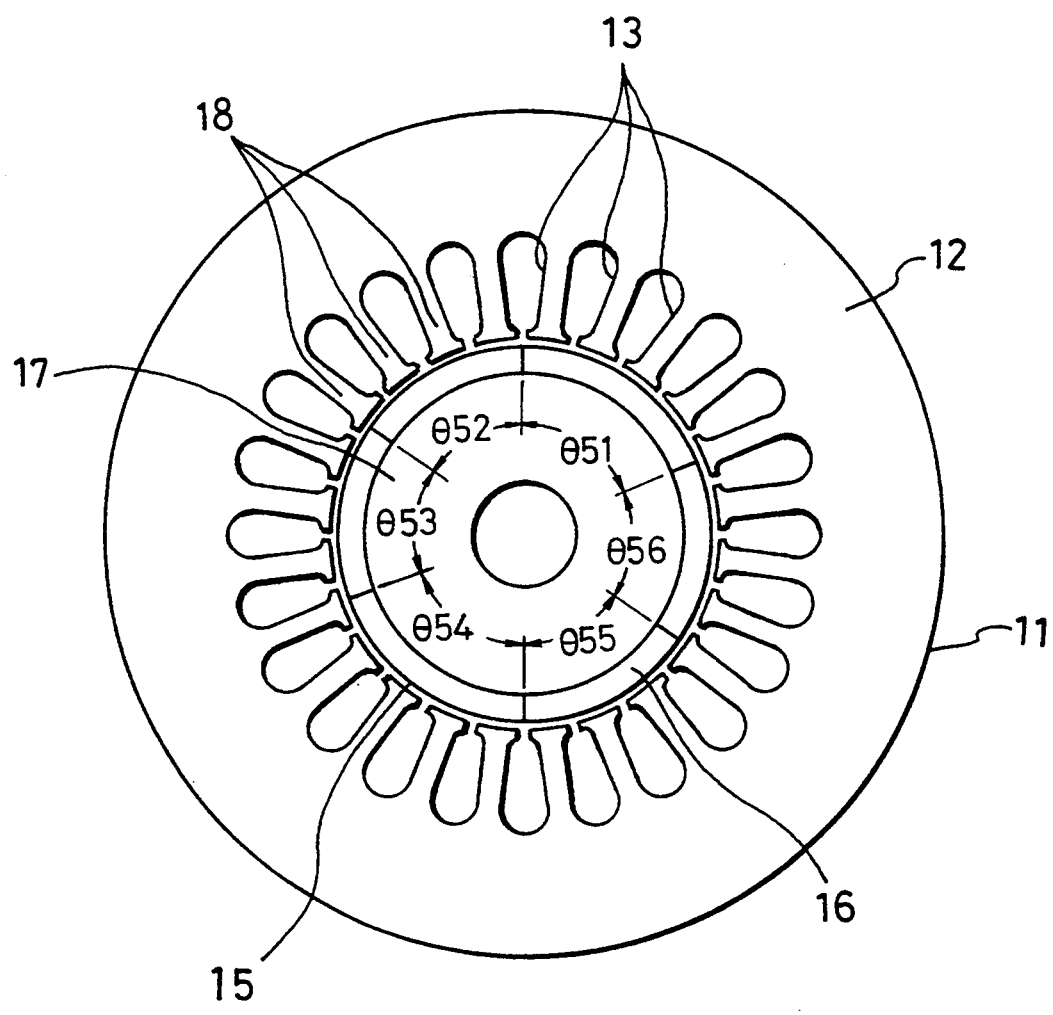
FIG. 6 is a cross-sectional view showing a part of the brushless motor of a fifth embodiment in the present invention.

FIG. 6 is a cross-sectional view showing the brushless motor of a fifth embodiment. Corresponding parts to the first embodiment are shown by the same numerals, and the description made thereon in the first embodiment is similarly applied. Six poles are provided in the permanent magnet 16, and twenty-four slots 13 are formed in the stator core 12 and arranged with a uniform angular interval. The number of poles is a divisor of the number of the slots 13. These six poles have respective occupation angles $\theta 51$ of 70°, $\theta 52$ of 55°, $\theta 53$ of 55°, $\theta 54$ of 70°, $\theta 55$ of 55° and $\theta 56$ of 55° which are arranged into rotational symmetry with respect to the rotation axis of the rotor 15 by a rotation angle of 180°. Therefore, the angles $\theta 51$, $\theta 52$, $\theta 53$, $\theta 54$, $\theta 55$ and $\theta 56$ correspond to 4.667, 3.667, 3.667, 4.667, 3.667 and 3.667 slot-pitches, respectively. That is, there are larger and smaller slot-pitches 4.667 and 3.667, and a difference between them is equal to one slot-pitch (15°).

A cogging torque $T_6$ of the above-mentioned fifth embodiment is represented by an equation:

$$T_6 = T_m \sin\phi + T_m \sin(\phi + 120°) + \\ T_m \sin(\phi + 240°) + T_m \sin\phi + \\ T_m \sin(\phi + 120°) + T_m \sin(\phi + 240°) = 0. \quad (6)$$

A value of the cogging torque $T_6$ is thus made zero.

Embodiment 6

Figure 7:
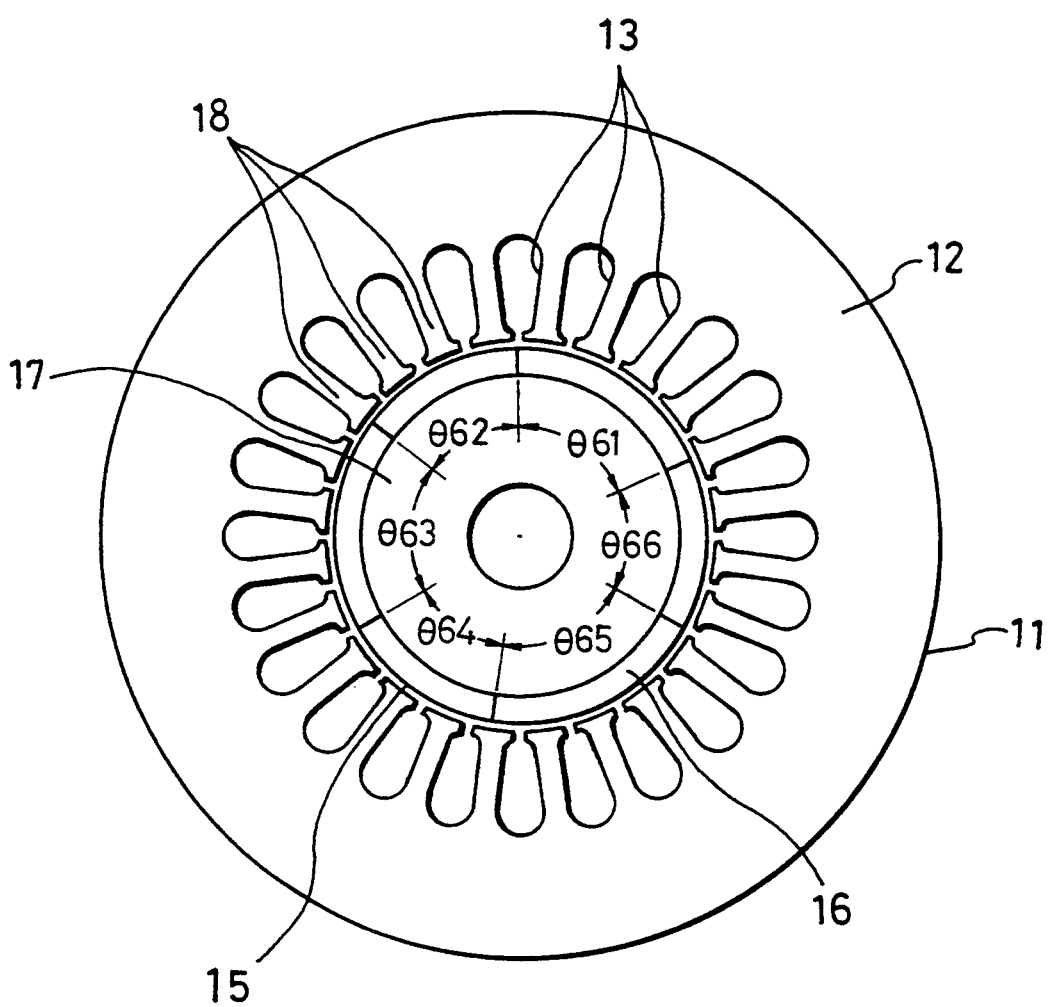
FIG. 7 is a cross-sectional view showing a part of the brushless motor of a sixth embodiment in the present invention.
Figure 8:
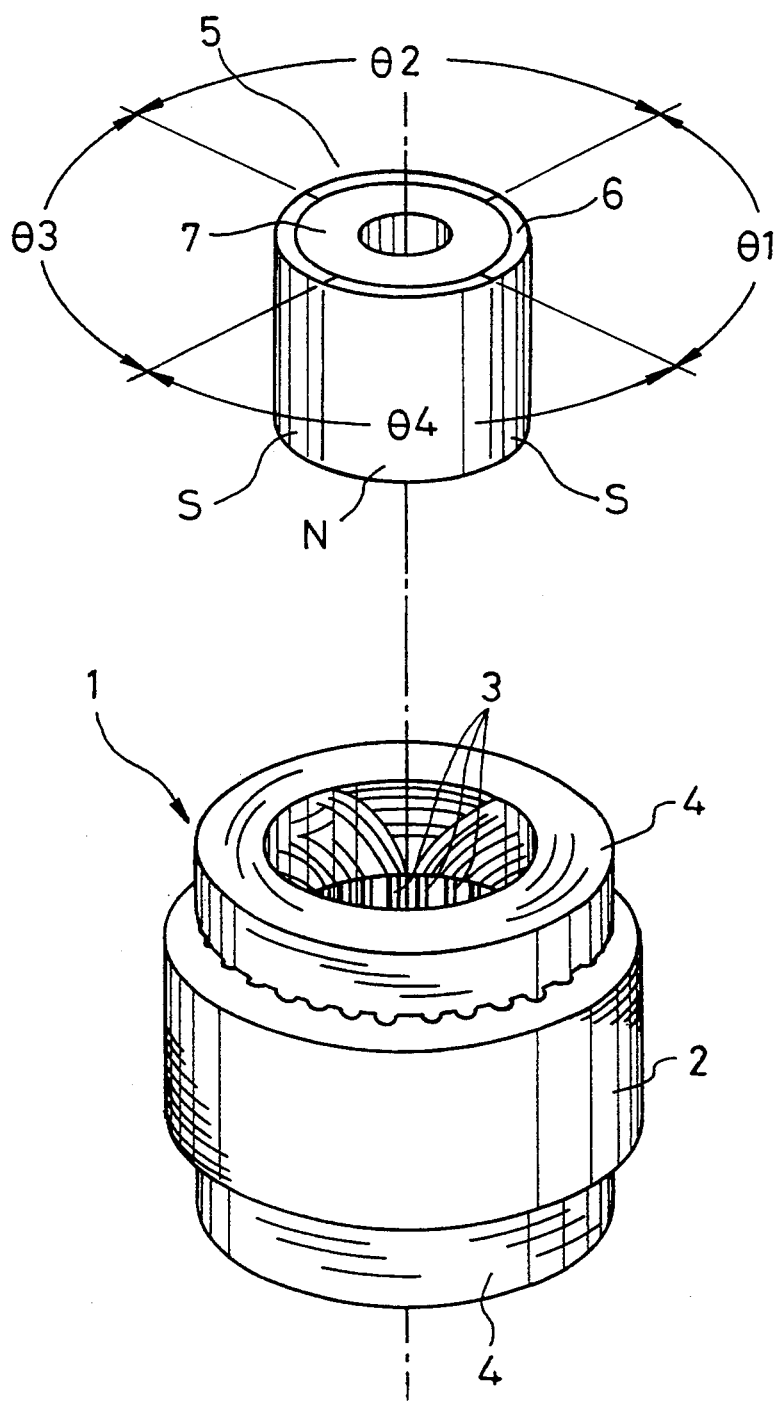
FIG. 8 is a perspective view showing a part of the conventional brushless motor.
Figure 9:
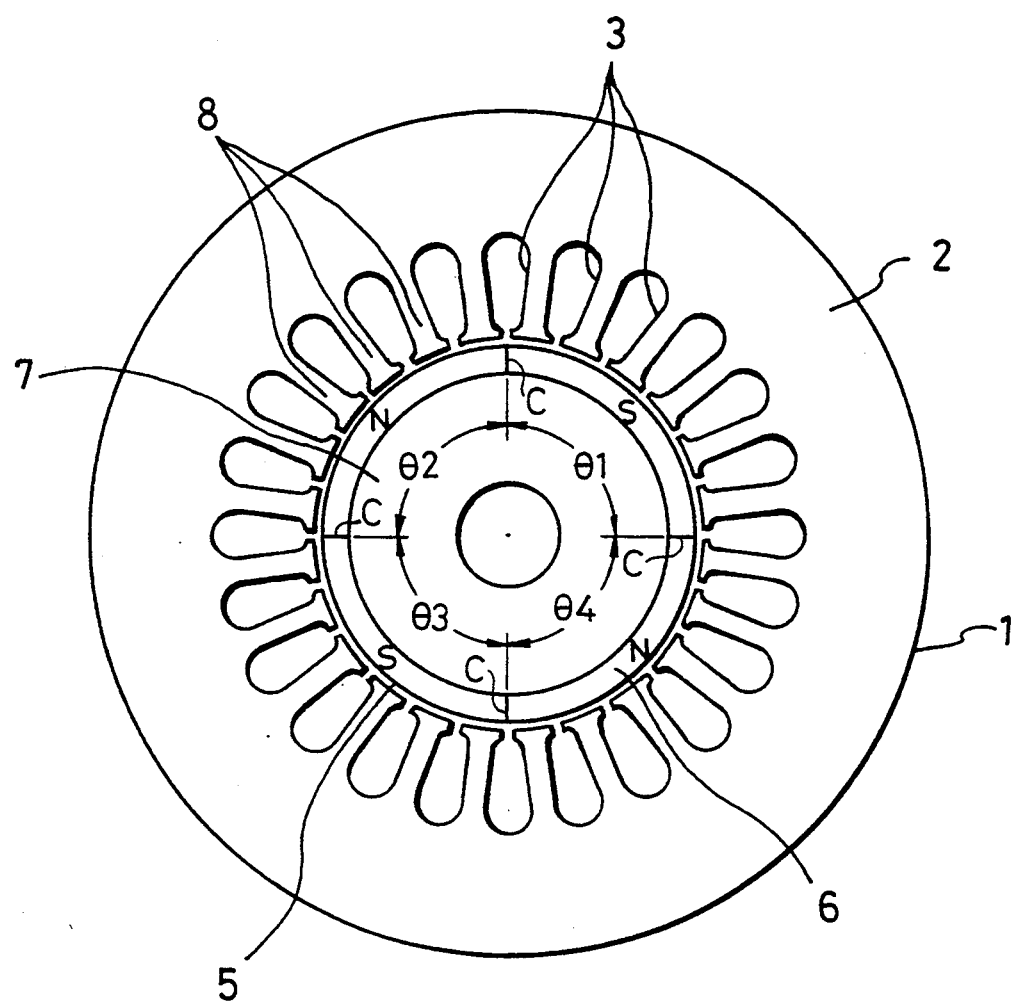
FIG. 9 is a cross-sectional view showing a part of the brushless motor shown in FIG. 8.
Figure 10:
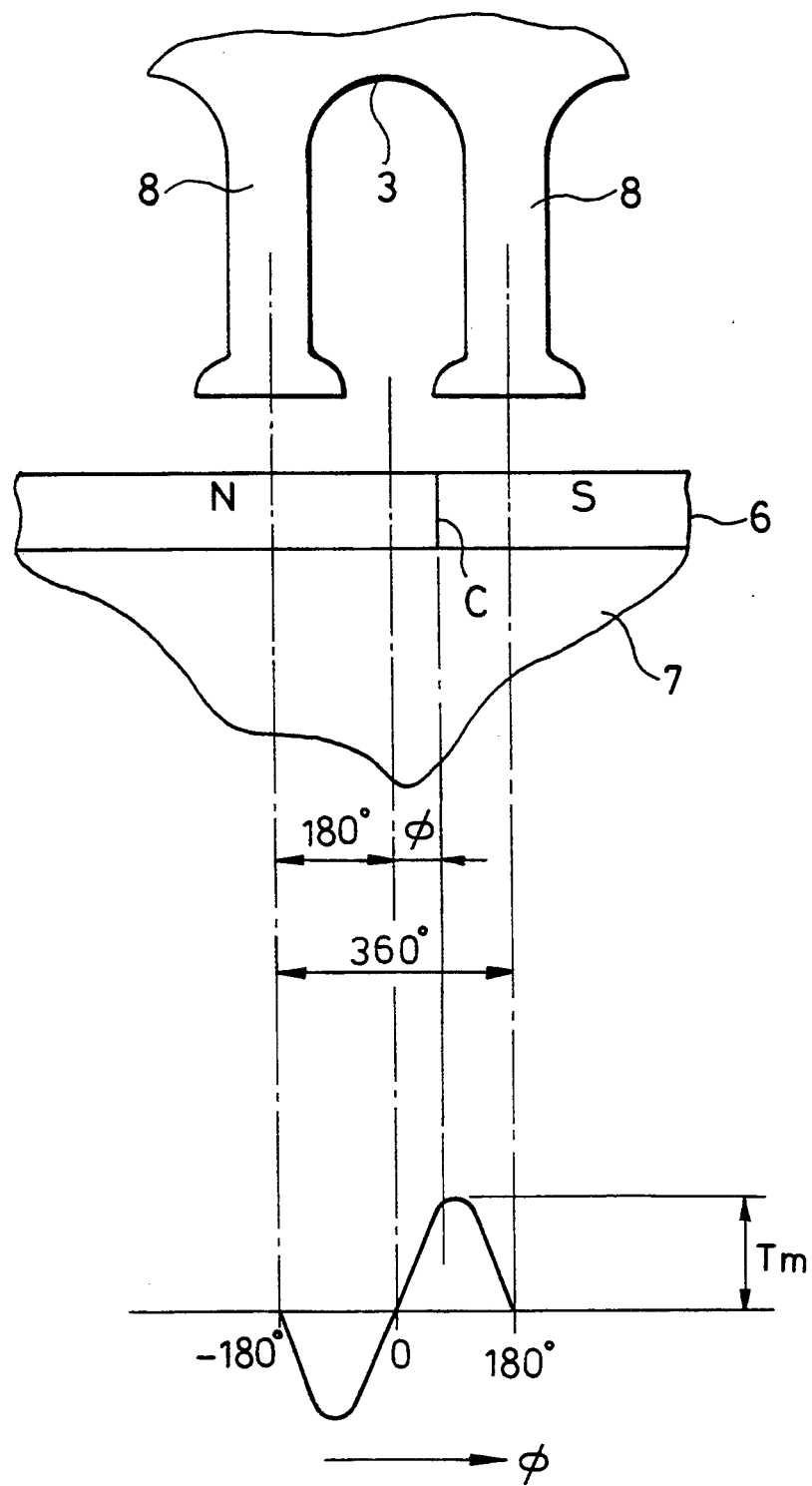
FIG. 10 is an illustration showing a linear-expanded positional relation between a boundary C and a teeth member 8 and a waveform of the cogging torque caused by one boundary C.

FIG. 7 is a cross-sectional view showing the brushless motor of a sixth embodiment. Corresponding parts to the first embodiment are shown by the same numerals, and the description made thereon in the first embodiment is similarly applied. Six poles are provided in the permanent magnet 16, and twenty-four slots 13 are formed in the stator core 12 and arranged with a uniform angular interval. The number of poles is a divisor of the number of the slots 13. These six poles have respective occupation angles $\theta 61$ of 67.5°, $\theta 62$ of 52.5°, $\theta 63$ of 67.5°, $\theta 64$ of 52.5°, $\theta 65$ of 67.5° and $\theta 66$ of 52.5°. Therefore, the angles $\theta 61$, $\theta 62$, $\theta 63$, $\theta 64$, $\theta 65$ and $\theta 66$ correspond to 4.5, 3.5, 4.5, 3.5, 4.5 and 3.5 slot-pitches, respectively. That is, there are larger and smaller slot-pitches 4.5 and 3.5, and a difference between them is equal to one slot-pitch (15°).

A cogging torque $T_7$ of the above-mentioned sixth embodiment is represented by an equation:

$$T_7 = T_m \sin\phi + T_m \sin(\phi + 180°) + \\ T_m \sin\phi + T_m \sin(\phi + 180°) + \\ T_m \sin\phi + T_m \sin(\phi + 180°) = 0. \quad (7)$$

A value of the cogging torque $T_7$ is thus made zero.

In the above-mentioned respective embodiments, the number of poles is four or six, and the number of slots 13 is fixed to twenty-four. However, these numbers are not limited to the above-mentioned values. Indispensable conditions are to have a relationship in that the number of poles is a divisor of the number of slots and to have a difference by one slot-pitch between the two kinds (large and small) of the pole occupation angles provided in the brushless motor. Also, it was found that the difference of two or more slot-pitches is not desirable for practical use. The difference of one slot-pitch is the only and the best way for the present invention.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A brushless motor comprising:
   a stator including a stator core and stator windings, said stator core having a plurality n of teeth members which define therebetween said plurality n of slots disposed at a uniform angular interval; and
   a rotor including a rotor core and a permanent magnet which consists of a plurality m of pole pieces facing said stator;
   said plurality m being a divisor of said plurality n, and said plurality m of pole pieces having two different occupation angles $\Theta_L$ and $\Theta_S$ in a rotating direction of said rotor on a whole, said occupation angle $\Theta_L$ being larger than said second occupation angle $\Theta_S$ by an angle of (360°/n).

2. A brushless motor in accordance with claim 1, wherein
   two of said plurality m of pole pieces have occupation angles $\Theta_L$ and are arranged adjacent to each other.

3. A brushless motor in accordance with claim 1, wherein said occupation angles $\Theta_L$ and $\Theta_S$ are rotationally symmetrical with respect to a 180° rotation about a rotational axis of said rotor.

4. A brushless motor in accordance with claim 1, wherein
only one of said plurality m of pole pieces has said occupation angle $\Theta_L$.

5. A brushless motor in accordance with claim 1, wherein
said plurality m of pole pieces are alternately arranged in accordance with said occupation angles $\Theta_L$ and $\Theta_S$.

6. A brushless motor in accordance with claim 1, wherein said plurality m is an integer larger than three.

7. A brushless motor comprising:
a stator including a stator core and stator windings, said stator core having a plurality n of teeth members which define therebetween said plurality n of slots disposed at a uniform angular interval; and
a rotor including a rotor core and a permanent magnet which consists of a plurality m of pole pieces facing said stator;
said plurality n being an integer larger than three;
said plurality m being a divisor of said plurality n; and
said plurality m of pole pieces of said rotor each having an occupation angle in a rotating direction of said rotor, said occupation angle being one of a first occupation angle $\Theta_L$ and a second occupation angle $\Theta_S$, said first occupation angle $\Theta_L$ being larger than said second occupation angle $\Theta_S$ by an angle of (360°/n).

8. A brushless motor in accordance with claim 7, wherein said plurality m is an integer larger than three.

9. A brushless motor comprising:
a stator including a stator core and stator windings, said stator core having a plurality n of teeth members which define therebetween said plurality n of slots disposed at a uniform angular interval; and
a rotor including a rotor core and a permanent magnet which consists of a plurality m of pole pieces facing said stator, a first one of said plurality m of pole pieces being disposed at a first occupation angle $\Theta_L$ and a second one of said plurality m of pole pieces being disposed at a second occupation angle $\Theta_S$ different from said first occupation angle $\Theta_L$, said first occupation angle $\Theta_L$ and said second occupation angle $\Theta_S$ being in a rotating direction of said rotor;
said plurality m being a divisor of said plurality n; and
said first occupation angle $\Theta_L$ being larger than said second occupation angle $\Theta_S$ by an angle of (360°/n).

10. A brushless motor in accordance with claim 9, wherein
a third one of said plurality m of pole pieces of said rotor being disposed at a third occupation angle which is equal to said first occupation angle $\Theta_L$, said third one of said plurality m of pole pieces being arranged adjacent to said second one of said plurality m of pole pieces.

* * * * *